United States Patent Office 3,259,541
Patented July 5, 1966

3,259,541
NOVEL COMPLEX SALTS OF PENTA-COORDINATED TIN
Ludwig Schröder, Klaus Thomas, and Dietrich Jerchel, all of Ingelheim (Rhine), Germany, assignors to C. H. Boehringer Sohn, Ingelheim (Rhine), Germany, a limited partnership of Germany
No Drawing. Filed Dec. 16, 1964, Ser. No. 418,905
Claims priority, application Germany, Dec. 18, 1963, B 74,722
41 Claims. (Cl. 167—22)

This invention relates to novel complex salts of tin and processes for preparing these salts.

More particularly, the present invention relates to complex salts of pentacoordinated tin of the formula

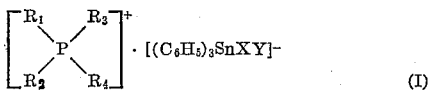

(I)

wherein
$R_1$, $R_2$, $R_3$ and $R_4$, which may be identical to or different from each other, are hydrogen, straight or branched, saturated or unsaturated aliphatic hydrocarbon radicals of 1 to 12 carbon atoms which may have one or more hydroxyl, halogen, alkoxycarbonyl or aminocarbonyl substituents attached thereto and/or whose carbon chain may be interrupted by a sulfur or oxygen atom, or alicyclic, araliphatic or aromatic hydrocarbon radicals whose cyclic moities may have one or more halogen, alkyl, alkoxy or nitro substituents attached thereto, provided, however, that at least one of substituents $R_1$ through $R_4$ is other than hydrogen, and
X and Y, which may be identical to or different from each other, are anions of inorganic or organic acids preferably of a hydrohalic acid, hydrocyanic acid or thiocyanic acid.

The novel complex salts according to the present invention may be prepared by the following methods:

METHOD A

By reacting a phosphonium salt of the formula

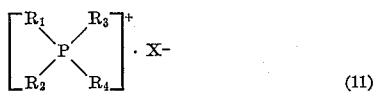

(II)

wherein $R_1$ through $R_4$ and X have the same meanings as in Formula I, with a triphenyl tin salt of the formula $$(C_6H_5)_3SnY \quad \text{(III)}$$

wherein Y has the same meanings as in Formula I. The reaction is advantageously carried out by using equimolar quantities of the starting compounds at room temperature and in the presence of an inert organic solvent, such as methylene chloride, ethylene chloride, methanol, ethanol, chloroform, acetone, dimethylformamide or the like. Thereafter the solvent is evaporated and/or the reaction product is precipitated with ether, and the precipitate is purified by recrystallization.

METHOD B

For the preparation of those compounds of the Formula I wherein X and Y are halogen, by reacting a phosphine of the formula

(IV)

wherein $R_1$ through $R_3$ have the same meanings as in Formula I, with a compound of the formula $$R_4Hal \quad \text{(V)}$$

wherein $R_4$ has the same meanings as in Formula I with the exception of hydrogen and aryl and Hal is a halogen, and with a compound of the formula $$(C_6H_5)_3SnHal \quad \text{(VI)}$$

where Hal is a halogen. This one-step reaction is advantageously carried out by using equimolar quantities of the starting compounds at elevated temperatures, preferably between 80 and 150° C., without or in the presence of an inert organic solvent and if necessary in a closed reaction vessel. The reaction period is generally from 4 to 24 hours. Examples of suitable inert organic solvents are those mentioned in Method A above. The reaction product may be isolated by distilling off the solvent and/or precipitation with ether. Thereafter, the raw complex salt may be purified by recrystallization.

The following examples illustrate the present invention and will enable others skilled in the art to understand it more completely. It should be understood, however, that the present invention is not limited to the particular examples given below.

*Example 1.*—Preparation of [triethylbenzylphosphonium]-[triphenylbromo-chloro-stannate] by Method A 28.9 gm. (0.1 mol) of triethylbenzylphosphonium bromide were dissolved in 100 cc. of methanol, and the resulting solution was admixed with a solution of 38.5 gm. (0.1 ml) of triphenyl tin chloride in 100 cc. of methanol. The methanol solvent was then evaporated, and the residue was recrystallized from isopropanol. 48 gm. (71% of theory) of a substance having a melting point of 129° C. were obtained, which was identified to be the complex tin salt of the formula

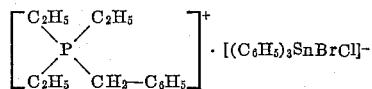

*Example 2.*—Preparation of [tetra-(chloromethyl)-phosphonium]-[triphenyl-dichloro-stannate] by Method A 26.4 gm. (0.1 mol) of tetra-(chloromethyl)-phosphonium chloride were dissolved in 100 cc. of methanol, and the resulting solution was admixed with a solution of 38.5 gm. (0.1 mol) of triphenyl tin chloride in 100 cc. of acetone. The mixed solution was vigorously agitated and was then admixed with an ample amount of ether. A precipitate formed which was separated and recrystallized from ethanol. 49 gm. (74% of theory) of a substance having a melting point of 124–126° C. were obtained. It was identified to be the complex tin salt of the formula

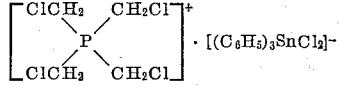

*Example 3.*—Preparation of [triphenyl-decyl-phosphonium]-[triphenyl-bromo-chloro-stannate] by Method B 26.2 gm. (0.1 mol) of triphenylphosphine, 22.1 gm. (0.1 mol) of decyl bromide and 38.5 gm (0.1 mol) of triphenyl tin chloride were dissolved in 200 cc. of methanol, and the solution was heated for twelve hours at 120° C. in a closed vessel. Thereafter, the reaction solution was allowed to cool, the solvent was evaporated, and the residue was recrystallized from isopropanol. 73.5 gm. (84% of theory) of a substance having a melting point of 119° C. were obtained. It was identified to be the complex tin salt of the formula

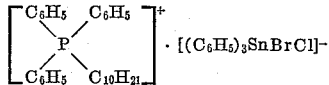

Example 4

Using a procedure analogous to that described in Example 1, [triphenyl-(p-chlorophenyl)-phosphonium]-[triphenyl-chloro-bromo-stannate], M.P. 161–163° C., of the formula

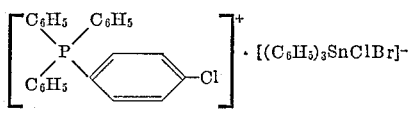

was prepared from triphenyl - (p - chlorophenyl) - phosphonium bromide and triphenyl tin chloride. The yield was 67.5% of theory.

Example 5

Using a procedure analogous to that described in Example 2, [triphenyl-methoxymethyl-phosphonium]-[triphenyl-dichloro-stannate], M.P. 136–138° C., of the formula

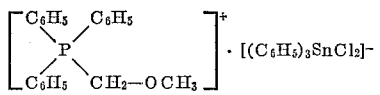

was prepared from triphenyl-methoxymethyl-phosphonium chloride and triphenyl tin chloride. The yield was 55% of theory.

Example 6

Using a procedure analogous to that described in Example 2, [triphenyl - ethoxymethyl - phosphonium] - [triphenyl-dichloro-stannate], M.P. 117–119° C., of the formula

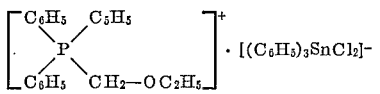

was prepared from triphenyl-ethoxymethyl-phosphonium chloride and triphenyl tin chloride. The yield was 54% of theory.

Example 7

Using a procedure analogous to that described in Example 2, [triphenyl - chloromethyl - phosphonium] - [triphenyl-dichloro-stannate], M.P. 171–172° C., of the formula

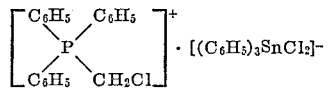

was prepared from triphenyl-chloromethyl-phosphonium chloride and triphenyl tin chloride. The yield was 82% of theory.

Example 8

Using a procedure analogous to that described in Example 2, [triphenyl-hydroxymethyl-phosphonium]-[triphenyl-dichloro-stannate], M.P. 138–140° C., of the formula

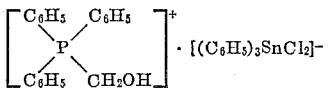

was prepared from triphenyl-hydroxymethyl-phosphonium chloride and triphenyl tin chloride. The yield was 49% of theory.

Example 9

Using a procedure analogous to that described in Example 2, [triphenyl-methyl-phosphonium]-[triphenyl-dichloro-stannate], M.P. 146–147° C., of the formula

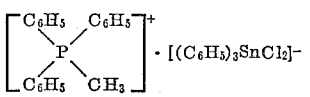

was prepared from triphenyl-methyl-phosphonium chloride and triphenyl tin chloride. The yield was 76% of theory.

Example 10

Using a procedure analogous to that described in Example 3 [triphenyl-ethyl-phosphonium]-[triphenyl-chloro-bromo-stannate], M.P. 139–140° C., of the formula

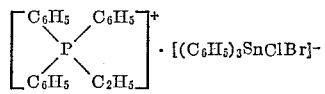

was prepared from triphenylphosphine, ethyl bromide and triphenyl tin chloride. The yield was 61% of theory.

Example 11

Using a procedure analogous to that described in Example 3 [triphenyl-n-propyl-phosphonium]-[triphenyl-chloro-bromo-stannate], M.P. 114–115° C., of the formula

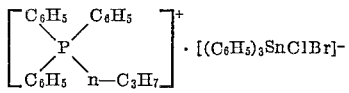

was prepared from triphenyl-phosphine, n-propyl bromide and triphenyl tin chloride. The yield was 50% of theory.

Example 12

Using a procedure analogous to that described in Example 3 [triphenyl - n - butyl-phosphonium]-[triphenyl-chloro-bromo-stannate], M.P. 127–129° C., of the formula

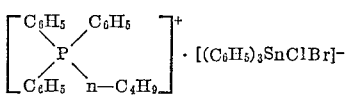

was prepared from triphenyl-phosphine, n-butyl bromide and triphenyl tin chloride. The yield was 65% of theory.

Example 13

Using a procedure analogous to that described in Example), [triphenyl - n - hexyl-phosphonium]-[triphenyl-chloro-bromo-stannate], M.P. 93–94° C., of the formula

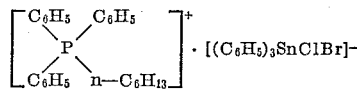

was prepared from triphenyl-phosphine, n-hexyl bromide and triphenyl tin chloride. The yield was 80% of theory.

Example 14

Using a procedure analogous to that described in Example 3, [triphenyl - allyl - phosphonium]-[triphenyl-chloro-bromo-stannate], M.P. 117–118° C., of the formula

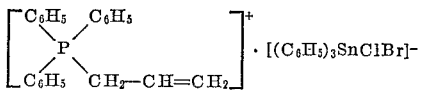

was prepared from triphenyl-phosphine, allyl bromide and triphenyl tin chloride. The yield was 67% of theory.

Example 15

Using a procedure analogous to that described in Example 1 [triphenyl - benzyl - phosphonium]-[triphenyl-chloro-bromo-stannate], 195°–196° C., of the formula

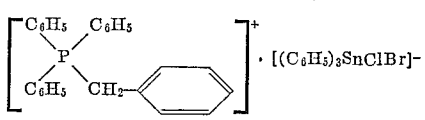

was prepared from triphenyl-benzyl-phosphonium bromide and triphenyl tin chloride. The yield was 78% of theory.

Example 16

Using a procedure analogous to that described in Example 1 [triphenyl - (γ - phenyl-n-propyl)-phosphonium]-

[triphenyl-chloro-bromo-stannate], M.P. 125–126° C., of the formula

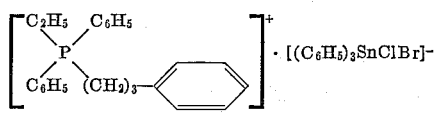

was prepared from triphenyl-(γ-phenyl-n-propyl)-phosphonium bromide and triphenyl tin chloride. The yield was 57% of theory.

*Example 17*

Using a procedure analogous to that described in Example 2 [triphenyl - (p - chloro-benzyl)-phosphonium]-[triphenyl-dichloro-stannate], M.P. 152–154° C., of the formula

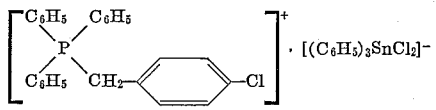

was prepared from triphenyl - (p-chloro-benzyl)-phosphonium chloride and triphenyl tin chloride. The yield was 68% of theory.

*Example 18*

Using a procedure analogous to that described in Example 1 [triphenyl - benzyl - phosphonium]-[triphenyl-dichloro-stannate], M.P. 205–207° C., of the formula

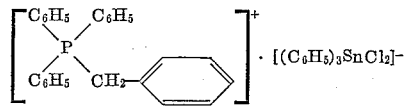

was prepared from triphenyl-benzyl-phosphonium chloride and triphenyl tin chloride. The yield was 67% of theory.

*Example 19*

Using a procedure analogous to that described in Example 2 [triphenyl - (p - chloro-benzyl)-phosphonium]-[triphenyl-dichloro-stannate], M.P. 177–178° C., of the formula

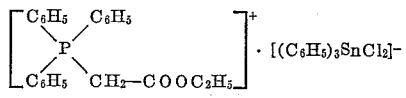

was prepared from triphenyl-carbethoxymethyl-phosphonium chloride and triphenyl tin chloride. The yield was 77% of theory.

*Example 20*

Using a procedure analogous to that described in Example 2 [triphenyl - carbethoxymethyl - phosphonium]-[triphenyl-dichloro-stannate], M.P. 141–152° C., of the formula

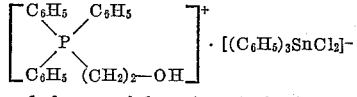

was prepared from triphenyl - (β-hydroxy-ethyl)-phosphonium chloride and triphenyl tin chloride. The yield was 80% of theory.

*Example 21*

Using a procedure analogous to that described in Example 2 [triphenyl - diphenylmethyl - phosphonium]-[triphenyl-dichloro-stannate], M.P. 205–206° C., of the formula

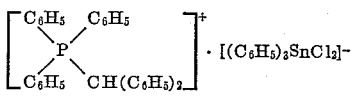

was prepared from triphenyl-diphenylmethyl-phosphonium chloride and triphenyl tin chloride. The yield was 54% of theory.

*Example 22*

Using a procedure analogous to that described in Example 3 [triphenyl - isopentyl-phosphonium]-[triphenyl-chloro - bromo - stannate], M.P. 150–153° C., of the formula

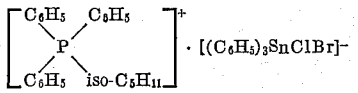

was prepared from triphenyl-phophine, isopentyl bromide and triphenyl tin chloride. The yield was 73% of theory.

*Example 23*

Using a procedure analogous to that described in Example 3 [triphenyl-n-dodecyl-phosphonium]-[triphenyl-chloro-bromo-stannate], a non-distillable oil, of the formula

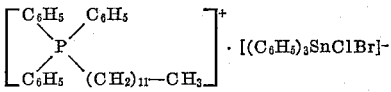

was prepared from triphenyl-phosphine, n-dodecyl-bromide and triphenyl tin chloride. The yield was 100% of theory.

*Example 24*

Using a procedure analogue to that described in Example 3 [tri-(n-butyl) - n - dodecyl - phosphonium]-[triphenyl - chloro - bromo - stannate], M.P. 118° C., of the formula

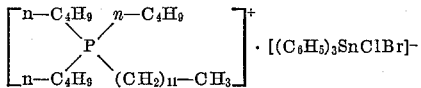

was prepared from tri-n-butyl-phosphine, n-dodecylbromide and triphenyl tin chloride. The yield was 16% of theory.

*Example 25*

Using a procedure analogous to that described in Example 1 [tribenzyl - phenyl - phosphonium]-[triphenyl-chloro - bromo - stannate], M.P. 156–157° C., of the formula

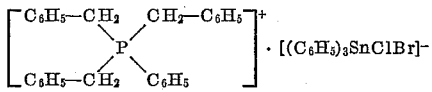

was prepared from tribenzyl - phenyl - phosphonium bromide and triphenyl tin chloride. The yield was 86% of theory.

*Example 26*

Using a procedure analogous to that described in Example 1 [diethyl - phenyl - benzyl - phosphonium]-[triphenyl - chloro - bromo - stannate], M.P. 114–115° C., of the formula

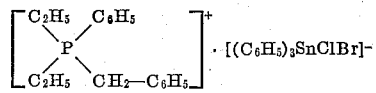

was prepared from diethyl - phenyl - benzyl - phosphonium bromide and triphenyl tin chloride. The yield was 93% of theory.

*Example 27*

Using a procedure analogous to that described in Example 1 [diphenyl - ethyl - benzyl - phosphonium]-[triphenyl-chloro-bromo-stannate], M.P. 178° C., of the formula

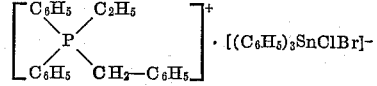

was prepared from diphenyl-ethyl-benzyl-phosphonium bromide and triphenyl tin chloride. The yield was 100% of theory.

Example 28

Using a procedure analogous to that described in Example 1 [dibenzyl - phenyl - methyl - phosphonium]-[triphenyl - chloro - iodo - stannate], M.P. 121° C., of the formula

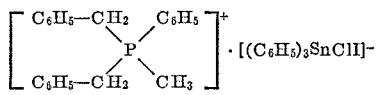

was prepared from dibenzyl - phenyl - methyl - phosphonium iodide and triphenyl tin chloride. The yield was 22% of theory.

Example 29

Using a procedure analogous to that described in Example 1 [triphenyl - (β - hydroxy - ethyl)-phosphonium]-[triphenyl - di - (thiocyano) - stannate], M.P. 124–125° C., of the formula

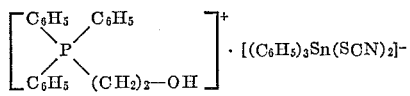

was prepare from triphenyl - (β - hydroxy - ethyl)-phosphonium thiocyanide and triphenyl tin thiocyanide. The yield was 88% of theory.

Example 30

Using a procedure analogous to that described in Example 2 [tetraphenyl-phosphonium]-[triphenyl-dichlorostannate], M.P. 203–205° C., of the formula

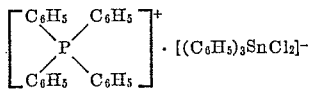

was prepared from tetraphenyl-phosphonium-chloride and triphenyl tin chloride. The yield was 78% of theory.

Example 31

Using a procedure analogous to that described in Example 3 [triphenyl-ethylmercaptomethyl-phosphonium]-[triphenyl-dichloro-stannate], M.P. 160–161° C., of the formula

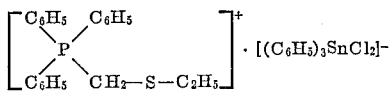

was prepared from triphenyl-phosphine, ethylmercaptomethyl chloride and triphenyl tin chloride. The yield was 83% of theory.

Example 32

Using a procedure analogous to that described in Example 1 [triphenyl-phosphonium]-[triphenyl - dichlorostannate], M.P. 152–153° C., of the formula

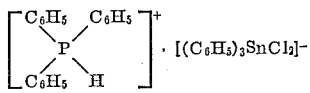

was prepared from triphenyl-phosphonium chloride and triphenyl tin chloride. The yield was 33% of theory.

Example 33

Using a procedure analogous to that described in Example 1 [triphenyl-(p-nitro-phenyl)-phosphonium]-[triphenyl-chloro-bromo-stannate], M.P. 201–203° C., of the formula

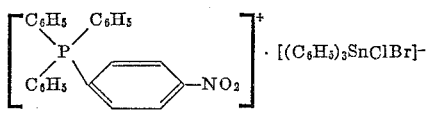

was prepared from triphenyl-(p-nitro-phenyl)-phosphonium bromide and triphenyl tin chloride. The yield was 81% of theory.

Example 34

Using a procedure analogous to that described in Example 1 [triphenyl-(p-methoxy-phenyl)-phosphonium]-[triphenyl-chloro-bromo-stannate], M.P. 134–136° C., of the formula

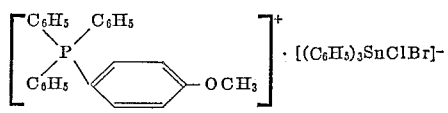

was prepared from triphenyl-(p-methoxy-phenyl)-phosphonium bromide and triphenyl tin chloride. The yield was 76% of theory.

Example 35

Using a procedure analogous to that described in Example 2 [triphenyl-(p-hydroxy-phenyl)-phosphonium]-[triphenyl-dichloro-stannate], M.P. 201–203° C., of the formula

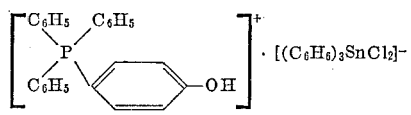

was prepared from triphenyl-(p-hydroxy-phenyl)-phosphonium chloride and triphenyl tin chloride. The yield was 54% of theory.

The novel compounds according to the present invention are derivatives of pentacoordinated tin, and their complex salt structure is confirmed by their physical properties. They have useful properties in that they exhibit anti-microbial activities. More particularly, they have bacteriostatic and fungistatic properties coupled with very low phytotoxicity. In addition, the complex tin salts of the present invention have molluscacidal and algicidal properties.

By virtue of these properties the compounds according to the present invention are useful for the protection of plants against bacteria and fungi, such as *Phytophthora infestans* and *Cercospora beticola*; as disinfectants for the control of bacteria and fungi, such as *Staphylococcus aureus* SG 511, *Streptococcus aronson*, Epidermophyton K.W. and *Aspergillus niger*, in the home, in hospitals and in industry, especially the textile, plastics and paint industry; as molluscacidal agents for the control and eradication of molluscs, such as *Australorbis glabratus*; and as algicidal agents for the control of algae on ships' hulls and bridge and pier supports.

The compounds according to the present invention may be used as anti-microbial agents either alone or in combination with known anti-microbial agents; in the latter case the selectivity, effective spectrum and compatibility may thereby be increased.

For the anti-microbial purposes set forth above the compounds according to the present invention are preferably employed as active ingredients in easily disseminatable liquid or solid compositions, such as sprays, aerosols, suspensions, dusting powders, solutions, wettable powders and the like. In addition to the active ingredient, such compositions may comprise customary inert adjuvants such as a liquid or solid carrier (water, kaolin, kieselguhr, etc.), a suspension stabilizer (Ca-lignin sulfonate), a wetting and dispersing agent (a naphthalene sulfonate) and a sticking agent (methylcellulose).

The following examples illustrate how the compounds according to the present invention may be incorporated into a wettable powder which may then be suspended in water or another suitable liquid vehicle to form an anti-microbial spray. The parts are parts by weight.

Example 36

The wettable powder is compounded from the following ingredients:

| | Parts |
|---|---|
| [Triethyl-benzyl-phosphonium]-[triphenyl-bromo-chloro-stannate] | 20 |
| Kaolin | 71.5 |
| Calcium-lignin sulfonate | 5 |
| Sodium naphthalene sulfonate | 2 |
| Methylcellulose | 1.5 |
| Total | 100 |

Compounding procedure:

The individual ingredients are admixed with each other, and the mixture is milled until homogeneous. The resulting powder is suspended in water, and the aqueous suspension is diluted until the desired concentration of the complex stannate is reached. The dilute aqueous suspension is an effective anti-microbial spray with negligible phytotoxicity.

Example 37

Another wettable powder is composed of the following ingredients:

| | Parts |
|---|---|
| [Tetra-(chloromethyl)-phosphonium]-[triphenyl-dichloro-stannate] | 50 |
| Kieselguhr | 33 |
| Calcium-lignin sulfonate | 9 |
| Sodium naphthalene sulfonate | 5 |
| Methyl cellulose | 3 |
| Total | 100 |

The compounding and dilution procedure is the same as in the preceding example. The dilute aqueous suspension is an effective anti-microbial composition which may easily be disseminated by spraying or similar methods.

For molluscacidal purposes the wettable powders described in Examples 36 and 37 or similar compositions may be added as such to the body of water wherein the molluscs are to be eradicated or controlled. The compounds of the present invention have been found to be effective against *Australorbis glabratus* molluscs, for instance, at a concentration of as low as 1 p.p.m.

The bactericidal activity of the complex tin salts described herein was tested on the strains *Staphylococcus aureus* SG 511 and *Streptococcus aronson*; it was found that they completely inhibit the growth of these bacteria at a concentration of $1:10^5$ or higher. Similarly, their fungicidal activity was tested on Epidermophyton K.W. and *Aspergillus niger*; in both cases the complex salts effectively inhibited the growth of the fungi at concentrations of $1:10^5$ and $1:10^6$. In disinfectant compositions, a concentration of 1:5000 to 1:10,000 of the novel complex salts is preferred.

It should be understood that the compositions of Examples 36 and 37 above are merely illustrative. Thus, any of the other complex tin salts embraced by Formula I above may be substituted for the particular species shown in these examples. Moreover, the amounts of the complex salts in these compositions may be varied to meet particular requirements, as may the nature and amounts of the inert adjuvants.

While the present invention has been illustrated with the aid of certain specific embodiments thereof, it will be readily apparent to others skilled in the art that the invention is not limited to these embodiments and that various changes and modifications may be made without departing from the spirit of the invention or the scope of the appended claims.

We claim:

1. A complex salt of pentacoordinated tin of the formula

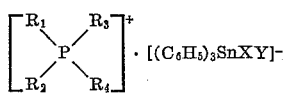

wherein $R_1$, $R_2$, $R_3$ and $R_4$ are each selected from the group consisting of hydrogen, acyclic hydrocarbons of 1 to 12 carbon atoms, hydroxyl-substituted acyclic hydrocarbons of 1 to 12 carbon atoms, halo-substituted acyclic hydrocarbons of 1 to 12 carbon atoms, alkoxycarbonyl-substituted acyclic hydrocarbons of 1 to 12 carbon atoms, aminocarbonyl-substituted acyclic hydrocarbons of 1 to 12 carbon atoms, acyclic hydrocarbons of 1 to 12 carbon atoms whose carbon chain is interrupted by a heteroatom selected from the group consisting of oxygen and sulfur, alicyclic hydrocarbons, halo-substituted alicyclic hydrocarbons, alkyl-substituted alicyclic hydrocarbons, alkoxy-substituted alicyclic hydrocarbons, nitro-substituted alicyclic hydrocarbons araliphatic hydrocarbons, araliphatic hydrocarbons having a substituent selected from the group consisting of halogen, alkyl, alkoxy and nitro attached to the aromatic moiety thereof, aromatic hydrocarbons, halo-substituted aromatic hydrocarbons, alkyl-substituted aromatic hydrocarbons, alkoxy-substituted aromatic hydrocarbons and nitro-substituted aromatic hydrocarbons, provided, however, that at least one of said substituents $R_1$ through $R_4$ is other than hydrogen, and X and Y are each selected from the group consisting of anions or organic and inorganic acids.

2. A complex salt of pentacoordinated tin of the formula

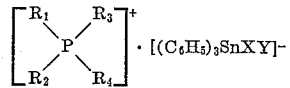

wherein $R_1$, $R_2$, $R_3$ and $R_4$ are each selected from the group consisting of hydrogen, alkyl of 1 to 12 carbon atoms, hydroxy-lower alkyl, halo-lower alkyl, lower alkoxy-lower alkyl, lower alkylthio-lower alkyl, lower alkoxycarbonyl-lower alkyl, phenyl-lower alkyl, diphenyl-lower alkyl, lower alkenyl, phenyl, halo-phenyl, nitro-phenyl, lower alkoxy-phenyl, hydroxy-phenyl and halo-benzyl, provided, however, that at least one of $R_1$ through $R_4$ is other than hydrogen, and X and Y are each selected from the group consisting of halogen and thiocyano.

3. A complex salt of pentacoordinated tin of the formula

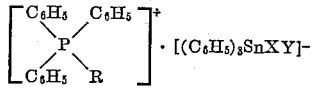

wherein

R is selected from the group consisting of hydrogen, alkyl of 1 to 12 carbon atoms, hydroxy-lower alkyl, halo-lower alkyl, lower alkoxy-lower alkyl, lower alkoxycarbonyl-lower alkyl, lower alkylthio-lower alkyl, lower alkenyl, phenyl-lower alkyl, diphenyl-lower alkyl, halophenyl-lower alkyl, phenyl, halo-phenyl, nitro-phenyl, lower alkoxy-phenyl, hydroxy-phenyl, and X and Y are each selected from the group consisting of halogen and thiocyano.

4. A complex salt of pentacoordinated tin of the formula

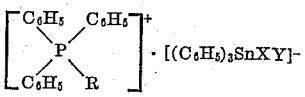

wherein

R is selected from the group consisting of hydrogen, alkyl of 1 to 12 carbon atoms, chloromethyl, hydroxymethyl, hydroxyethyl, ethoxycarbonyl-methyl, methoxy-methyl, ethoxymethyl, ethylthio-methyl, diphenyl-methyl, allyl, phenyl, chloro-phenyl, nitro-phenyl, methoxy-phenyl, hydroxy-phenyl, benzyl, chloro-benzyl and phenyl-propyl, X is selected from the group consisting of chlorine and thiocyano, and Y is selected from the group consisting of halogen and thiocyano.

5. [Triethylbenzylphosphonium]-[triphenyl-bromo-chloro-stannate].

6. [Tetra-(chloromethyl)-phosphonium]-[triphenyl-dichloro-stannate].

7. [Triphenyl-decyl-phosphonium]-[triphenyl-bromo-chloro-stannate].

8. [Triphenyl-(p-chlorophenyl)-phosphonium]-[triphenyl-chloro-bromo-stannate].

9. [Triphenyl-methoxymethyl-phosphonium]-[triphenyl-chloro-stannate].

10. [Triphenyl-ethoxymethyl-phosphonium]-[triphenyl-dichloro-stannate].

11. [Triphenyl-chloromethyl-phosphonium]-[triphenyl-dichloro-stannate].

12. [Triphenyl-hydroxymethyl-phosphonium]-[triphenyl-dichloro-stannate].

13. [Triphenyl-methyl-phosphonium]-[triphenyl-dichloro-stannate].

14. [Triphenyl-ethyl-phosphonium]-[triphenyl-chloro-bromo-stannate].

15. [Triphenyl-n-propyl-phosphonium]-[triphenyl-chloro-bromo-stannate].

16. [Triphenyl-n-butyl-phosphonium]-[triphenyl-chloro-bromo-stannate].

17. [Triphenyl-n-hexyl-phosphonium]-[triphenyl-chloro-bromo-stannate].

18. [Triphenyl-allyl-phosphonium]-[triphenyl-chloro-bromo-stannate].

19. [Triphenyl-benzyl-phosphonium]-[triphenyl-chloro-bromo-stannate].

20. [Triphenyl($\gamma$-phenyl-n-propyl)-phosphonium]-[triphenyl-chloro-bromo-stannate].

21. [Triphenyl-(p-chloro-benzyl)-phosphonium]-[triphenyl-dichloro-stannate].

22. [Triphenyl-benzyl-phosphonium]-[triphenyl-dichloro-stannate].

23. [Triphenyl-carbethoxymethyl-phosphonium]-[triphenyl-dichloro-stannate].

24. [Triphenyl-($\beta$-hydroxy-ethyl)-phosphonium]-[triphenyl-dichloro-stannate].

25. [Triphenyl-diphenylmethyl-phosphonium]-[triphenyl-dichloro-stannate].

26. [Triphenyl-isopentyl-phosphonium]-[triphenyl-chloro-bromo-stannate].

27. [Triphenyl-n-dodecyl-phosphonium]-[triphenyl-chloro-bromo-stannate].

28. [Tri-(n-butyl)-n-dodecyl-phosphonium]-[triphenyl-chloro-bromo-stannate].

29. [Triphenzyl-phenyl-phosphonium]-[triphenyl-chloro-bromo-stannate].

30. [Diethyl-phenyl-benzyl-phosphonium]-[triphenyl-chloro-bromo-stannate].

31. [Diphenyl-ethyl-benzyl-phosphonium]-[triphenyl-chloro-bromo-stannate].

32. [Dibenzyl-phenyl-methyl-phosphonium]-[triphenyl-chloro-iodo-stannate].

33. [Triphenyl-($\beta$-hydroxy-ethyl)-phosphonium]-[triphenyl-di-(thiocyano)-stannate].

34. [Tetraphenyl-phosphonium]-[triphenyl-dichloro-stannate].

35. [Triphenyl-ethylmercaptomethyl-phosphonium]-[triphenyl-dichloro-stannate].

36. [Triphenyl-phosphonium]-[triphenyl-dichloro-stannate].

37. [Triphenyl-(p-nitro-phenyl)-phosphonium]-[triphenyl-chloro-bromo-stannate].

38. [Triphenyl-(p-methoxy-phenyl)-phosphonium]-[triphenyl-chloro-bromo-stannate].

39. [Triphenyl-(p-hydroxy-phenyl)-phosphonium]-[triphenyl-dichloro-stannate].

40. An anti-microbial and molluscacidal composition consisting essentially of an inert carrier and a complex salt of pentacoordinated tin of the formula

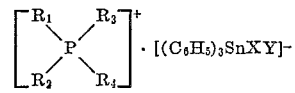

wherein $R_1$, $R_2$, $R_3$ and $R_4$ are each selected from the group consisting of hydrogen, acyclic hydrocarbons of 1 to 12 carbon atoms, hydroxyl-substituted acyclic hydrocarbonds of 1 to 12 carbon atoms, halo-substituted acyclic hydrocarbons of 1 to 12 carbon atoms, alkoxycarbonyl-substituted acyclic hydrocarbons of 1 to 12 carbon atoms, amino-carbonyl substituted acyclic hydrocarbons of 1 to 12 carbon atoms, acyclic hydrocarbons of 1 to 12 carbon atoms whose carbon chain is interrupted by a heteroatom selected from the group consisting of oxygen and sulfur, alicyclic hydrocarbons, halo-substituted alicyclic hydrocarbons, alkyl-substituted alicyclic hydrocarbons, alkoxy-substituted alicyclic hydrocarbons, nitro-substituted alicyclic hydrocarbons, araliphatic hydrocarbons, araliphatic hydrocarbons having a substituent selected from the group consisting of halogen, alkyl, alkoxy and nitro attached to the aromatic moiety thereof, aromatic hydrocarbons, halo-substituted aromatic hydrocarbons, alkyl-substituted aromatic hydrocarbons, alkoxy-substituted aromatic hydrocarbons and nitro-substituted aromatic hydrocarbons, provided, however, that at least one of said substituents $R_1$ through $R_4$ is other than hydrogen, and X and Y are each selected from the group consisting of anions of organic and inorganic acids, the concentration of said complex tin salt in said composition being at least one part per million.

41. The method of inhibiting the growth of microbes and molluscs, which comprises contacting said microbes and molluscs with a complex salt of pentacoordinated tin of the formula

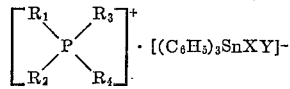

wherein $R_1$, $R_2$, $R_3$ and $R_4$ are each selected from the group consisting of hydrogen, acyclic hydrocarbons of 1 to 12 carbon atoms, hydroxyl-substituted acyclic hydrocarbons of 1 to 12 carbon atoms, halo-substituted acyclic hydrocarbons of 1 to 12 carbon atoms, alkoxycarbonyl-substituted acyclic hydrocarbons of 1 to 12 carbon atoms, aminocarbonyl-substituted acyclic hydrocarbons of 1 to 12 carbon atoms, acyclic hydrocarbons of 1 to 12 carbon atoms whose carbon chain is interrupted by a heteroatom selected from the group consisting of oxygen and sulfur, alicyclic hydrocarbons, halo-substituted alicyclic hydrocarbons, alkyl-substituted alicyclic hydrocarbons, alkoxy-substituted alicyclic hydrocarbons, nitro-substituted alicyclic hydrocarbons, araliphatic hydrocarbons, araliphatic hydrocarbons having a substituent selected from the group consisting of halogen, alkyl, alkoxy and nitro attached to the aromatic moiety thereof, aromatic hydrocarbons, halo-substituted aromatic hydrocarbons, alkyl-substituted aromatic hydrocarbons, alkoxy-substituted aromatic hydrocarbons and nitro-substituted aromatic hydrocarbons, provided, however, that at least one of said substituents $R_1$ through $R_4$ is other than hydrogen, and X and Y are each selected from the group consisting of anions of organic and inorganic acids.

No references cited.

TOBIAS E. LEVOW, *Primary Examiner.*

HELEN M. S. SNEED, *Assistant Examiner.*